US012377016B1

(12) United States Patent
Mullen

(10) Patent No.: US 12,377,016 B1
(45) Date of Patent: Aug. 5, 2025

(54) SELF-TAILORED MALE GENITAL STIMULATOR

(71) Applicant: Daniel H. Mullen, Jessup, MD (US)

(72) Inventor: Daniel H. Mullen, Jessup, MD (US)

(73) Assignee: DHM PRODUCTS LLC, Jessup, MD (US)

( * ) Notice: Subject to any disclaimer, the term of this patent is extended or adjusted under 35 U.S.C. 154(b) by 0 days.

(21) Appl. No.: 19/089,644

(22) Filed: Mar. 25, 2025

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/0153* (2013.01); *A61H 2201/0192* (2013.01); *A61H 2201/1215* (2013.01); *A61H 2201/1685* (2013.01); *A61H 2201/1688* (2013.01); *A61H 2201/1695* (2013.01); *A61H 2205/087* (2013.01)

(58) Field of Classification Search
CPC ........ A61H 19/00; A61H 19/30; A61H 19/32; A61H 2201/1253; A61F 5/453
See application file for complete search history.

(56) References Cited

U.S. PATENT DOCUMENTS 5,807,360 A * 9/1998 Shubin ............... A61B 10/0058 600/38
8,382,656 B1 * 2/2013 Brown ...................... A61F 5/41 600/38
8,852,080 B2 10/2014 Lewis
8,900,120 B2 12/2014 Lewis
10,272,011 B1 * 4/2019 Sloan ..................... A61H 7/001
11,730,665 B1 * 8/2023 Huang ................... A61H 23/02 600/38
11,737,949 B1 * 8/2023 Huang ................... A61H 19/32 600/38
11,752,063 B1 * 9/2023 Huang ................... A61H 19/32 600/38
11,925,592 B1 * 3/2024 Huang ................... A61H 19/32
2008/0065033 A1 * 3/2008 Matsuura ............... A61H 9/005 604/349
2010/0041944 A1 * 2/2010 Levy ...................... A61H 19/32 600/38
2013/0289345 A1 * 10/2013 Dorronsoro Rueda ...................... A61H 19/32 600/38

(Continued)

OTHER PUBLICATIONS

Acmejoy—Skyhawk 10 Vibrations Penis Ring for Couple and SemenSentry V—AcmeJoy.

(Continued)

*Primary Examiner* — Justine R Yu
*Assistant Examiner* — Christopher E Miller
(74) *Attorney, Agent, or Firm* — Lawrence B. Goodwin; Mandelbaum Barrett PC

(57) ABSTRACT

A kit for an adjustable stimulator for male genitalia comprises a cylindrical core having a cylindrical axis and an opening on its surface, a vibratory module having at least one vibrating unit thereon, a mount for mounting the vibratory module on the interior of the core, and a plurality of penetration lips for application to a selected end of the core, each of the plurality of lips having an annular opening of differing diameters, whereby a user is able to configure the stimulator to accommodate the dimensions of the user's erection.

19 Claims, 11 Drawing Sheets

(56) References Cited

U.S. PATENT DOCUMENTS

| | | | | |
|---|---|---|---|---|
| 2015/0141747 | A1* | 5/2015 | Kandelousy | A61H 19/32 600/38 |
| 2016/0317380 | A1* | 11/2016 | Gutierrez Villanueva | A61H 19/40 |
| 2018/0021212 | A1* | 1/2018 | Matsuura | A61H 9/0057 600/38 |
| 2018/0092798 | A1* | 4/2018 | Shao | A61H 19/32 |
| 2018/0344565 | A1* | 12/2018 | Sloan | A61H 19/32 |
| 2020/0046599 | A1* | 2/2020 | Sedic | A61F 5/41 |
| 2020/0268595 | A1 | 8/2020 | Lewis | |
| 2021/0113424 | A1* | 4/2021 | Yates | A61F 5/41 |
| 2021/0212886 | A1* | 7/2021 | Burnett-Jones | A61H 19/32 |
| 2023/0012669 | A1* | 1/2023 | Liu | A61H 19/32 |

OTHER PUBLICATIONS

Fleshlight® Official Store _ The #1 Male Sex Toy—Discreet Shipping.

Kai 2-Automatic Sucking Vibrating Male Masturbator Blowjob Sex Toy—Honey Play Box—Honey Play Box Official.

SLEEV _ Pleasure Products.

Sexoralab—Widowmaker—Rotating Sucking Masturbation Cup—www.sexoralab.com.

Seekheart A1 Series Lens Tube Masturbator Cup (https://www.seekheart.club/products/100126104-1).

* cited by examiner

Penetration Lips

No. 1 – for 1.0" diameter erection

No. 2 – for 1.125"

No. 3 – for 1.25"

No. 4 – for 1.375"

No. 5 – for 1.5"

No. 6 – for 1.625"

No. 7 – for 1.75"

No. 8 – for 1.875"

No. 9 – for 2.0"

No. 5 – for 1.5"
Erection Diameter

No. 2 for 1.125" erection diameter

No. 8 for 1.875" erection diameter

Penetration Lips

No. 1 – for 1.0" diam erection

No. 2 – for 1.125"

No. 3 – for 1.25"

No. 4 – for 1.375"

No. 5 – for 1.5"

No. 6 – for 1.625"

No. 7 - for 1.75"

No. 8 - for 1.875"

No. 9 - for 2.0"

SELF-TAILORED MALE GENITAL STIMULATOR

BACKGROUND OF THE INVENTION

The present invention relates to a device for stimulating male genitalia, specifically the penis. There are a wide variety of prior art devices that stimulate the male genitalia through a variety of means, including by applying vibration, but these tend to lack adjustability to accommodate male members of different sizes. Indeed, prior art vibrators for men are made of very soft silicone so as to be "one-size-fits-all" device, where no accommodation can be made for erection length or width.

The present invention, on the other hand, is fundamentally different from the prior art "one-size fits all" devices. It is directed to a device that can be easily tailored to a man's unique anatomy, i.e., (i) to accommodate erections of different lengths—to provide exact contact with frenulum, the most sensitive area of the penis, and (ii) to accommodate erections of different circumferences—to ensure a close, personalized fit around the erection.

SUMMARY OF THE INVENTION

An adjustable stimulator for male genitalia comprises a cylindrical core having an opening therethrough and a cylindrical axis, the opening being offset along the cylindrical axis such that the opening is closer to a first end of the core than a second end of the core, a selected one of a plurality of penetration lips having an annular opening and adapted to be placed on one of the first and second ends of the core, a vibratory module having at least one vibrating unit and adapted to be placed in the opening of the core such that the vibrating unit is located within the interior of the core, the vibrating unit being offset on the vibratory module along the cylindrical axis such that it is closer to a first end of the vibratory module than to a second end of the vibratory module, whereby the vibrating unit can be located at one of four discrete distances along the cylindrical axis relative to the penetration lip depending upon (i) whether the penetration lip is placed on the first or second end of the core, and (ii) the orientation of the vibratory module within the opening of the core, to thereby accommodate male members of different lengths.

The adjustable stimulator can further comprise a plurality of pads of differing thicknesses, whereby a selected one of the plurality of pads is adapted to be placed in the interior of the core to accommodate different diameters of male members. A plurality of penetration lips are also provided with annular openings of differing diameters, whereby a selected one of the penetration lips is adapted to be placed on one of the first and second ends of the core to accommodate different diameters of male members.

The vibrating unit is mounted on the interior of said core by a mount comprised of a flexible, resilient material, to allow the vibrating unit to move toward the interior of the core to thereby conform to the male member. The opening in the core is preferably rectangular and the vibratory module is comprised of a pair of vibrating units and a plurality of flexible projections aligned with each of the pair of vibrating units. The pair of vibrating units and the plurality of flexible projections are preferably flexibly and resiliently mounted on the vibratory module to allow the vibrating units and flexible projections to conform to the male member.

The adjustable stimulator may also include a handle connected to the vibratory module and extending radially outward therefrom, and a grip extending radially outward from the core opposite the handle. The penetration lips may be provided with a plurality of auxiliary openings having diameters smaller than the annular opening diameter, the auxiliary openings circumferentially disposed around the annular opening. Further, the penetration lips may be provided with at least one radial cut therethrough to facilitate quick removal of the stimulator from the male member. A top lip adapted to be placed on an end of the core opposite the penetration lip may also be provided, as well as a disposable liner adapted to be disposed within the interior of the core.

In accordance with another aspect of the present invention, kit for an adjustable stimulator for male genitalia comprises a cylindrical core having a cylindrical axis and an opening on its surface, a vibratory module having at least one vibrating unit thereon, a mount for mounting the vibratory module on the interior of the core, and a plurality of penetration lips for application to a selected end of the core, each of the plurality of lips having an annular opening of differing diameters, whereby a user is able to configure the stimulator to accommodate the dimensions of the user's erection. Specifically, the stimulator can be configured to accommodate the diameter of a user's erection by selecting a specific one of the plurality of penetration lips. Further a plurality of pads of differing thicknesses can be applicated to the interior of the core at a location diametrically opposite the opening, to thereby further accommodate the diameter of a user's erection.

The stimulator can also be configured to accommodate the length of a user's erection. Specifically, the opening is offset on the core along the cylindrical axis such that it is closer to a first end of the core than a second end of the core, the at least one vibrating unit is offset on the vibratory module along the cylindrical axis such that it is closer to a first end of the vibratory module than to a second end of the vibratory module, and the stimulator can be configured to accommodate the length of a user's erection by placing one of the penetration lips on a selected end of the core, and by selectively orienting the vibratory module on the core.

Preferably, the mount is comprised of a resilient material, to thereby allow a user to force the at least one vibrating unit into contact with the user's erection using a precise amount of pressure, and the force may immediately be removed to thereby immediately remove contact between the vibrating unit and the erection.

BRIEF DESCRIPTION OF THE DRAWINGS

These and other objects and aspects of the present invention will be described with reference to the following drawing figures, of which.

DETAILED DESCRIPTION

Figure 1:
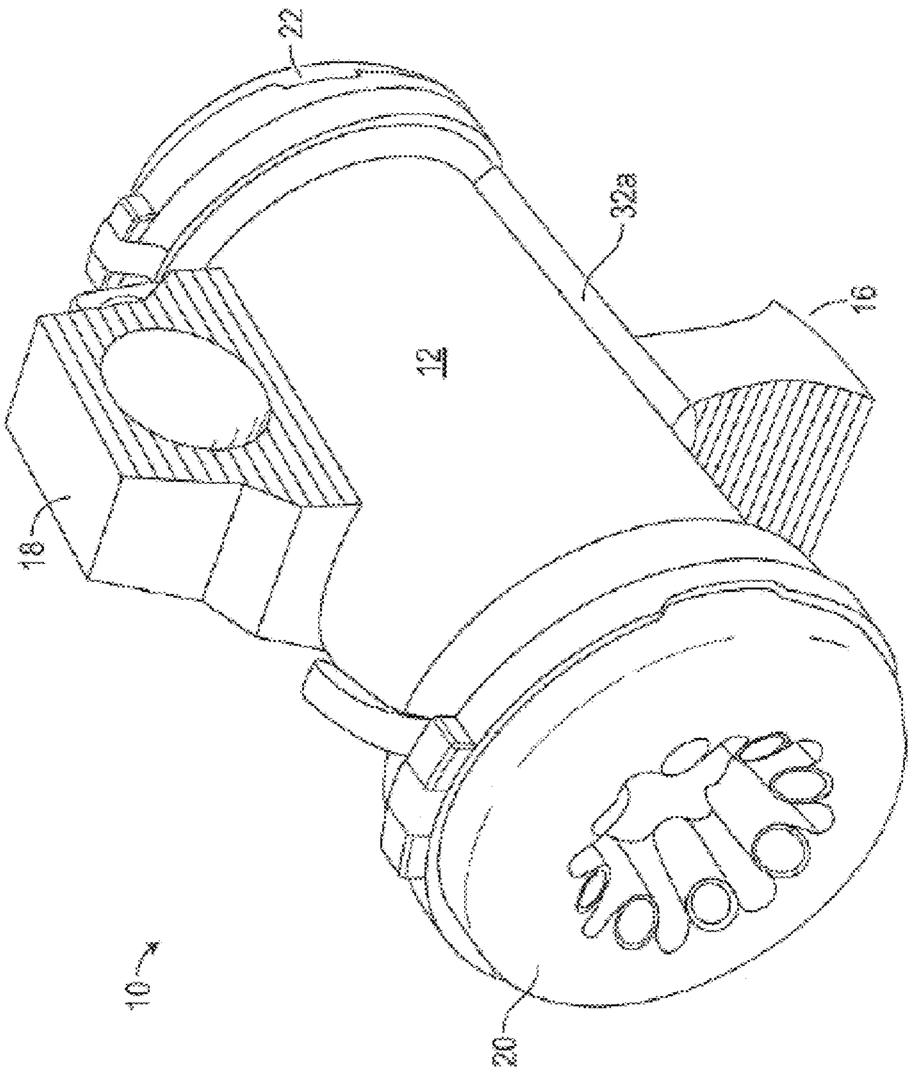
FIGS. 1 and 2 are perspective views of an example of the adjustable stimulator according to the present invention.
Figure 2:
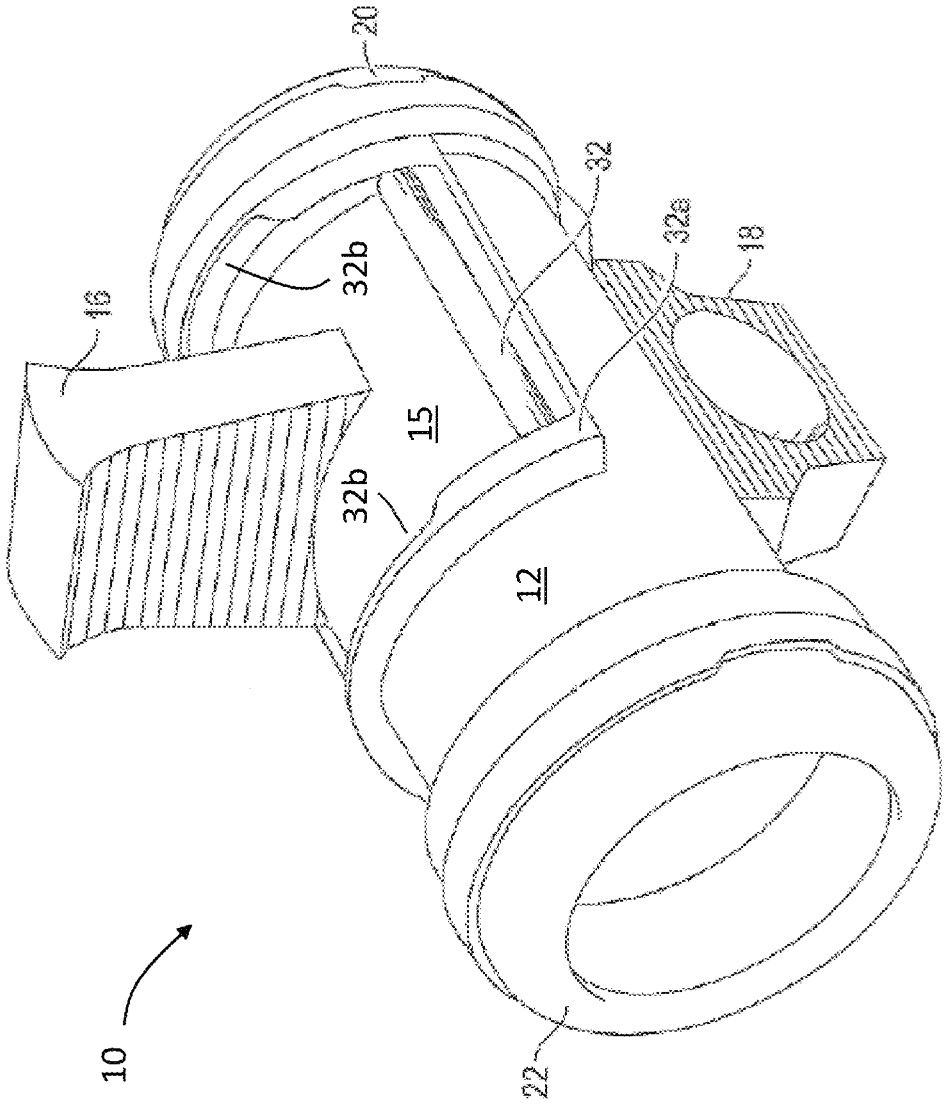

With reference to FIGS. 1 and 2, the adjustable stimulator 10 is comprised of a cylindrical core 12 formed of a firm material such as acrylic or ABS plastic, a vibratory module 14 (FIG. 3), a vibratory module handle 16 connected to the module 14, a thumb grip 18 permanently affixed to the core, a penetration lip 20 and a top lip 22. As explained below, the module 14 is secured to the core by vibratory module mount 15, FIG. 14B. The module 14, penetration lip 20 and top lip 22 are removably secured to the core in the positions as shown. Alternatively, if desired, the thumb grip 18 can be dispensed with and the handle 16 can be oriented and provided with a finger hole to allow operation with a single hand.

Figure 3:
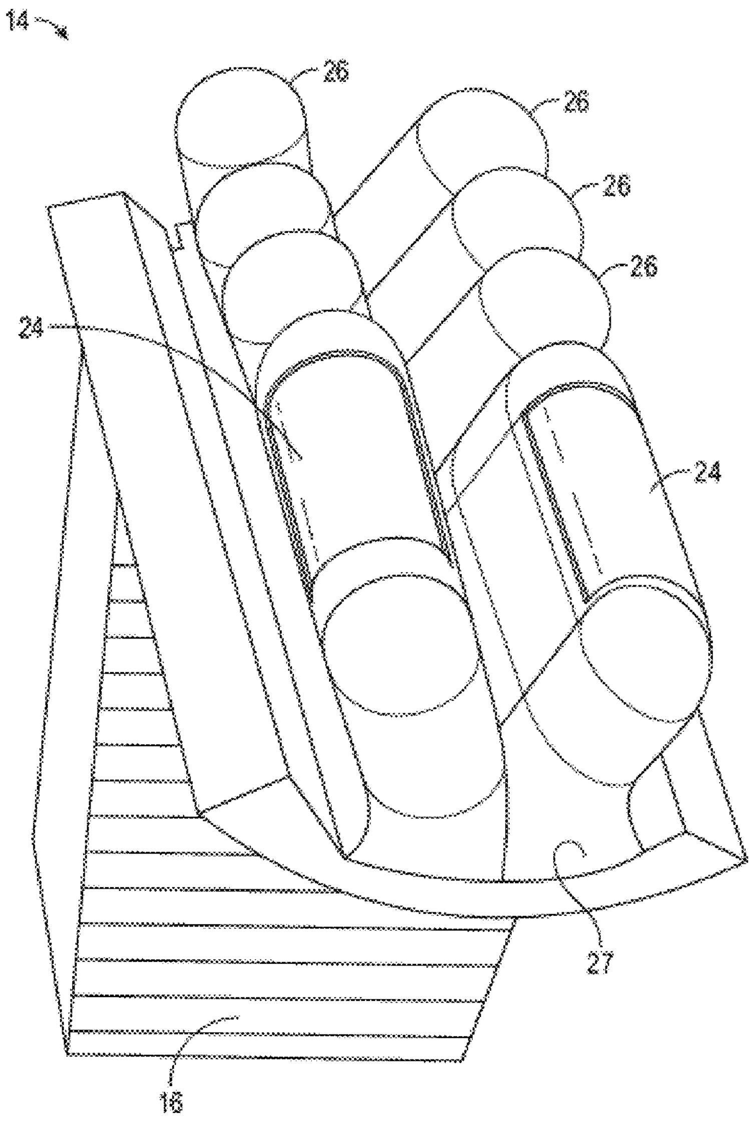
FIG. 3 is a perspective view of an example of a vibratory module used with the device of FIGS. 1 and 2.

As shown in FIG. 3, the vibratory module 14 includes a pair of generally cylindrical vibration units 24, which can be battery or A/C powered, as desired. The electrical connections from the power supply to the vibration units are not shown but will be readily implemented by those skilled in the art. The vibratory module 14 also preferably includes two rows of a plurality of flexible fingers 26 adapted to maintain a generally co-planar orientation of the vibration units with the penis, thus maximizing the contact area between the vibration units and the penis. Each row of fingers is preferably aligned to be co-linear with its associated vibration unit. As will be appreciated, the number of fingers 26 can be selected to achieve the goal of maximizing the contact area, as described. The vibration units and flexible fingers are mounted on a flexible, resilient structure 27 as shown. Typically, the vibration units 24 will be approximately 1 & ⅛ inches in length, although different size units may be used if desired.

As best shown in FIGS. 4-7, the core 12 is provided with a rectangular opening 28 through which the vibratory module 14 is inserted such that the vibration units 24 and fingers 26 are disposed in the interior of the cylindrical core 12. The vibration module is securely held within the core by the vibratory module mount 15, FIG. 14B, as will be discussed.

Figure 5:
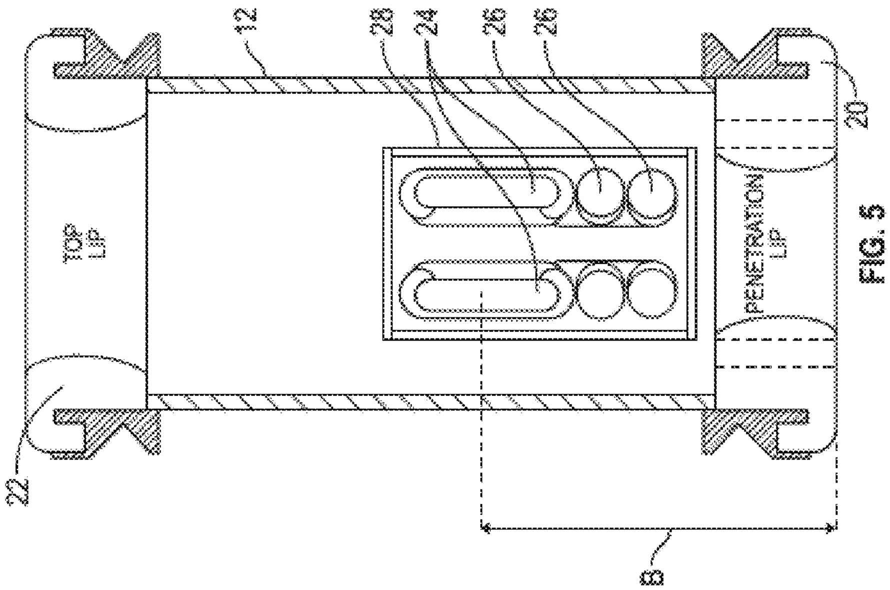
FIGS. 4-7 are cross sections showing the interior of the core of the adjustable stimulator, illustrating alternative mountings of the penetration lip, top lip, and vibratory module on the core to accommodate four discrete penis lengths.
Figure 4:
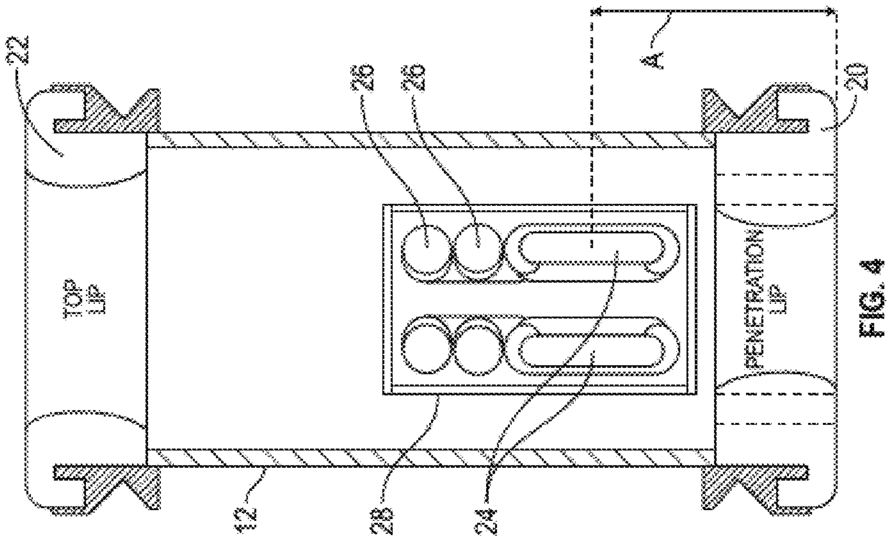

The stimulator in accordance with the present invention is adjustable to accommodate different lengths of male members, allowing the vibration units to be disposed precisely at the user's frenulum. As shown in the drawings, the location of the rectangular opening 28 is offset along the cylindrical axis of the core 12, such that it is substantially closer to the penetration lip 20 than it is to the top lip 22, as shown in FIGS. 4 and 5. Further, the vibration units 24 are offset along the long dimension of the vibratory module, as opposed to being centered along that dimension, such that the units 24 are positioned closer to the penetration lip 20 in FIG. 4 than they are as shown in FIG. 5, which is achieved by reversing by 180 degrees the orientation of the vibratory module within the core.

In use, the user's member is inserted into the core through the penetration lip 20. By orienting the vibratory module 14 within the core such that the vibration units 24 are closer to the penetration lip, as shown in FIG. 4, the units 24 will be disposed along the cylindrical axis of the core at distance A from the beginning of the penetration lip. By reversing the orientation of the module 14 by 180 degrees, as shown in FIG. 5, the units 24 will be disposed at distance B slightly further from the penetration lip than distance A.

Figure 7:
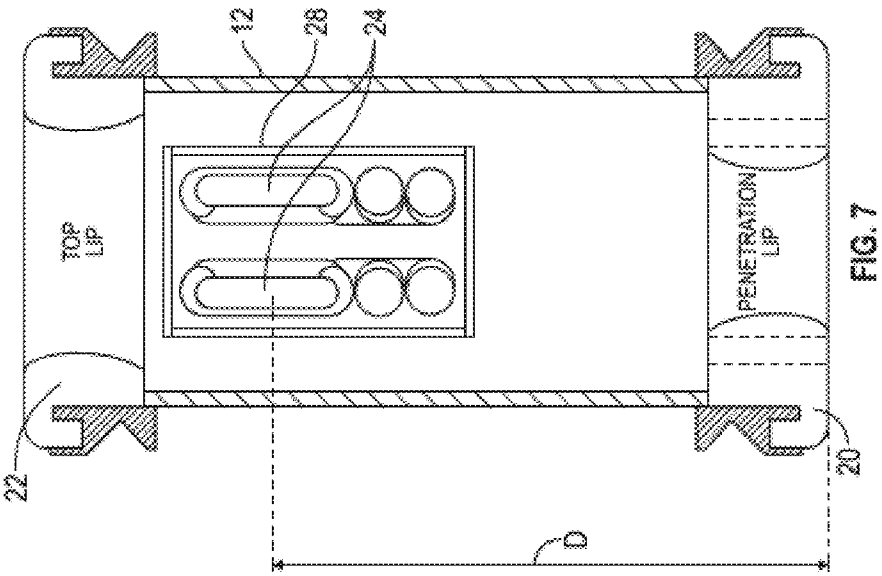
Figure 6:
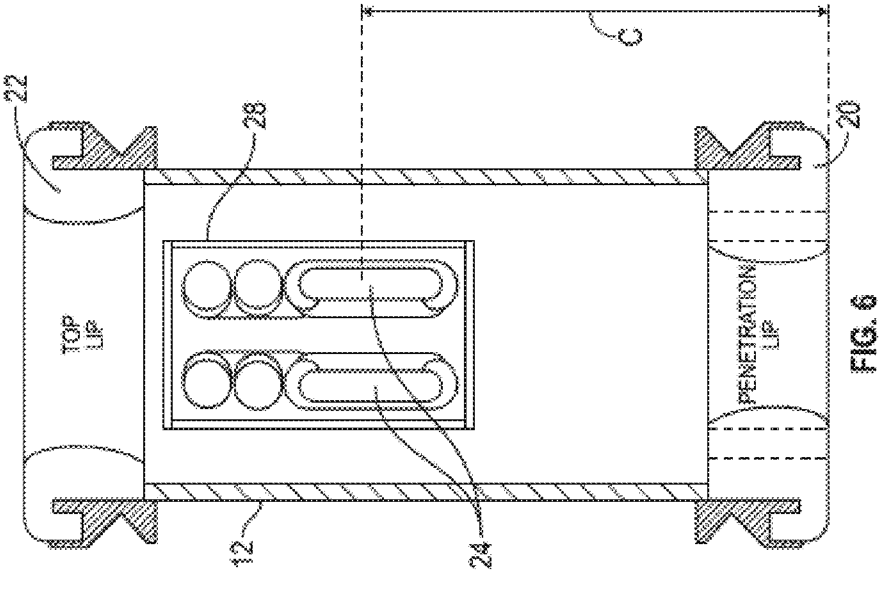

In FIGS. 6 and 7, the orientation of the core relative to the penetration and top lips is reversed, by switching the lips. Thus, the rectangular opening 28 in FIGS. 6 and 7 is closer to the top lip than the penetration lip. By orienting the vibratory module within the core such that the vibration units 24 are closer to the penetration lip 20, as shown in FIG. 6, the units 24 will be disposed along the cylindrical axis of the core at distance C slightly further from the beginning of the penetration lip 20 than distance B. By reversing the orientation of the module by 180 degrees, as shown in FIG. 7, the units 24 will be disposed at distance D from the beginning of the penetration lip 20 slightly further from the beginning of the penetration lip than distance C. In this manner, the vibration units can be positioned relative to the penetration lips at four discrete distances, A, B, C, and D, to accommodate members of different lengths. The axial dimensions of the core 12, the offset of the opening 28 along the core, and the offset of the vibration units 28 within the vibration module 14 can be selected such that dimensions A, B, C and D, measured from the center of the vibration units 24, to the end of the penetration lip 20, are approximately 2, 3, 4 and 5 inches from the penetration lip, although such dimensions may be modified as desired.

Figure 9:
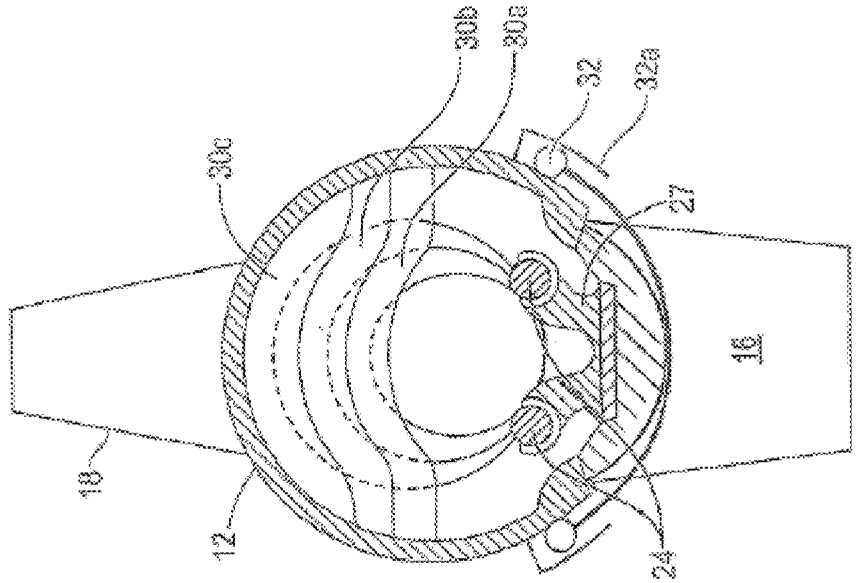
FIG. 9 is a cross-sectional view of the adjustable stimulator in a compressed position, with the vibration units compressed onto the penis.
Figure 8:
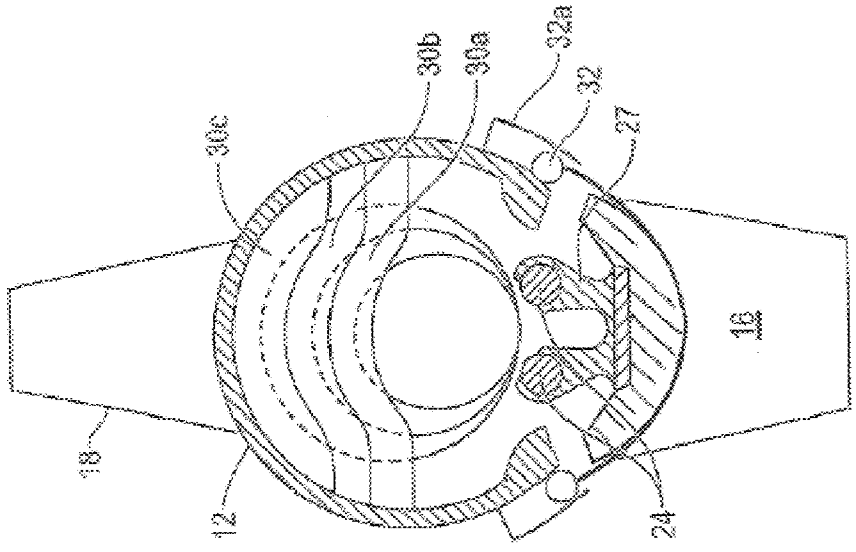
FIG. 8 is a cross-sectional view of the adjustable stimulator in an open position, in which the vibration units are not in contact with the penis, and further illustrating the use of alternative back pads within the core to accommodate different penis circumferences.
Figure 14A:
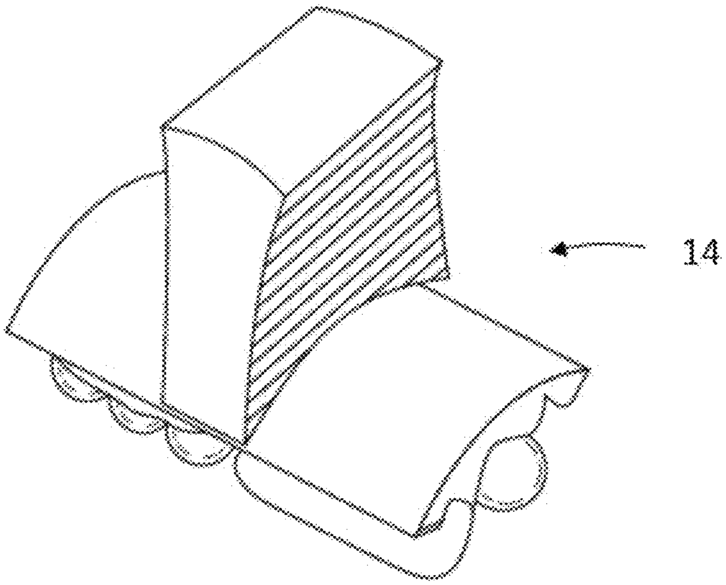
FIG. 14A is a perspective view of the top of the vibratory module.
Figure 14B:
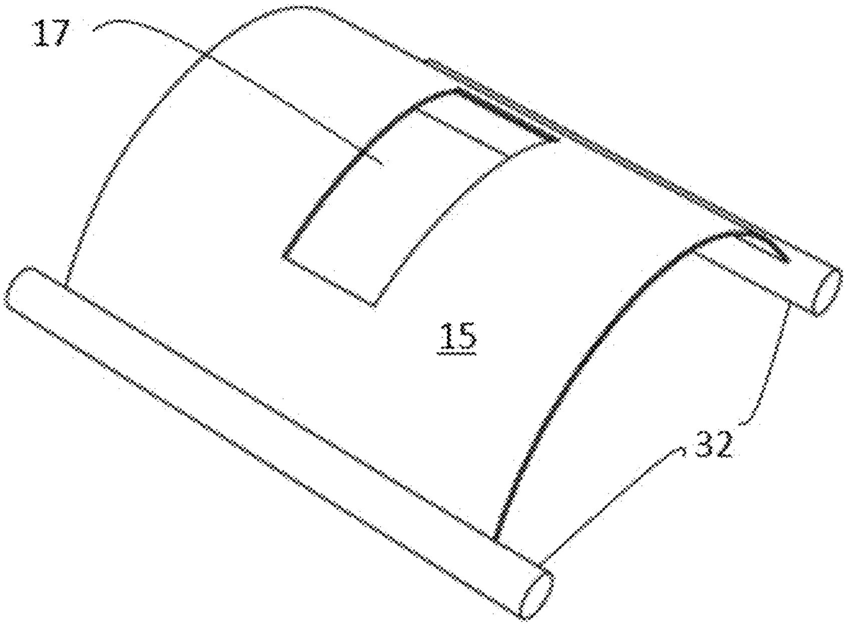
FIG. 14B is a perspective view of the top of the vibratory module mount.

As noted, the vibratory module 14, FIG. 14A, is secured to the core 12 by means of the vibratory module mount 15, FIG. 14B. The mount 15 is provided with a rectangular opening 17 and mounting rods 32 on opposing ends of the mount 15. The core, on the other hand, is provided with a track 32*a*, as shown in FIGS. 2, 8 and 9, generally centered about the opening 28 (FIGS. 4-7) in the core. Finally, the track 32*a* is provided with a recesses 32*b*, FIG. 2, allowing insertion of the mounting rods 32 into the track, as will be explained.

The mount 15 is made of a flexible, resilient material, readily allowing flexure toward the center of the core 12, when the handle 16 is pushed in that direction, and a resilient return in the opposite direction when the force on the handle 16 is released. The module 14 is connected to the core by first inserting handle of the module 14 through the opening 17 of the mount 15. The mount is then squeezed such that the mounting rods 32 are moved toward each other so that the ends of the rods can be inserted into the track 32*a* at the recesses 32*b*. The squeezing force is released to allow the rods 32 to move away from each other, to thereby capture the rods within the track 32*a*, and thus maintain the module 14 in the interior of the core, as best shown in FIGS. 8 and 9.

In its normal, uncompressed state, shown in FIG. 8, the vibration units 24 will not contact the penis. When the used moves handle 16 toward the interior of the core, as shown in FIG. 9, the units 24 will contact the penis. Thus, this configuration allows the user to apply exactly the amount of pressure to the penis, and the immediate release of pressure, as desired.

Importantly, and unlike the prior art, in addition to locating the vibration units 24 directly on the frenulum, the present invention also accommodates male members of different diameters. This is achieved through the use of a plurality of interchangeable penetration lips 20, shown and described in FIGS. 10, 10*a* and 10*b*, and backing pads 30*a*, 30*b* or 30*c*.

Figure 10:
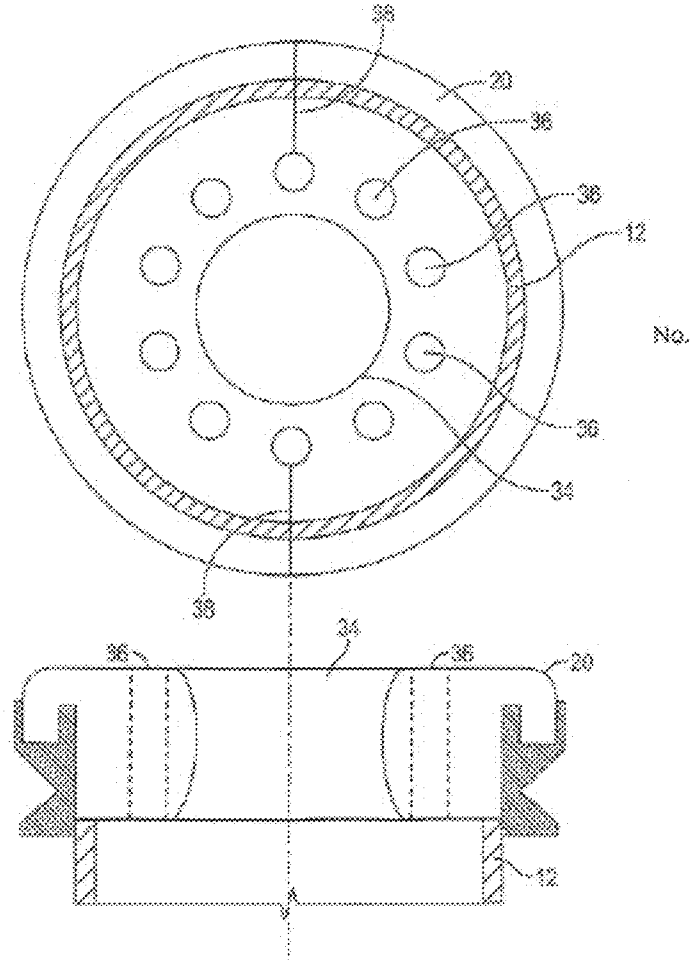
FIGS. 10, 10*a* and 10*b* illustrate top and cross-sectional side views, and preferred dimensions, of nine different penetration lips to be mounted on the front of the core, to accommodate a wide range of erections circumferences, specifically, from 1" to 2" in ⅛-inch increments.
Figure 10A:
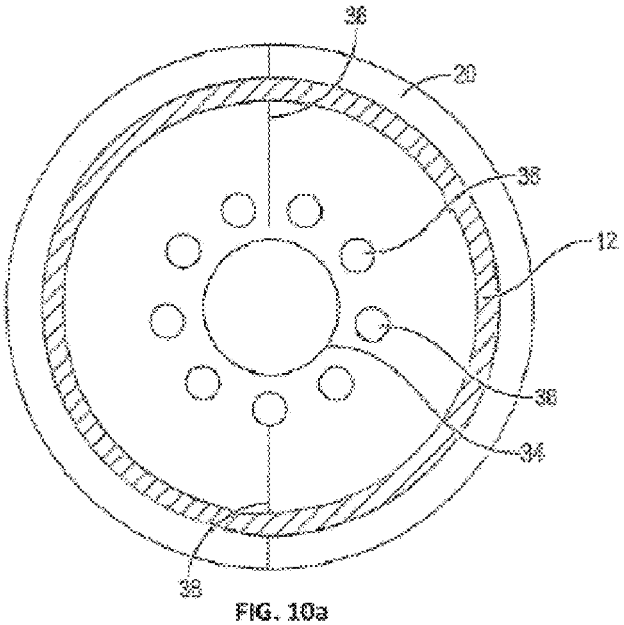
Figure 10B:
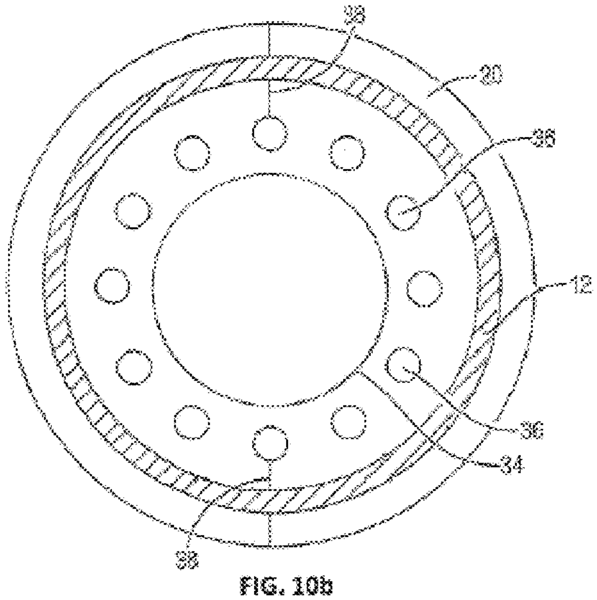

First, with respect to the penetration lips, preferably, a selected one of nine differently sized lips is used to ensure a customized fit on the erection. As shown in FIGS. 10, 10*a* and 10*b*, nine differently sized lips 20 having openings of different sizes, and formed of a relatively soft, resilient material, preferably silicone, can be provided for male members of different diameters, typically for erect diameters from 1" to 2" in ⅛-inch increments. Specifically, as shown in FIGS. 10, 10*a* and 10*b*, the lips are preferably sized as follows (although differing dimensions may be used as desired):

No. 1—for 1.0" diameter erection
No. 2 for 1.125" diameter erection
No. 3—for 1.25" diameter erection
No. 4—for 1.375" diameter erection
No. 5—for 1.5" diameter erection
No. 6—for 1.625" diameter erection
No. 7—for 1.75" diameter erection
No. 8—for 1.875" diameter erection
No. 9—for 2.0" diameter erection Each penetration lip 20 is provided with main opening 34 and circumferentially disposed auxiliary openings 36. Auxiliary openings 36 are provided to increase the flexibility of the lip 20 around the main opening 34. The auxiliary openings 36 can be on the order of ¼ inch in diameter, although other dimensions can be selected as desired. The number of auxiliary openings 36 may be selected based on the size of the main opening, for example, eight auxiliary openings 36 may be provided for the smallest main opening 34, and 12 auxiliary openings may be provided for the largest main opening 34. As shown in the figures, ten auxiliary openings can be provided for a 1.5" diameter (FIG. 10); nine auxiliary openings can be provided for a 1.125" diameter (FIG. 10*a*), and twelve auxiliary openings can be provided for a 1.875" diameter (FIG. 10*b*). Cuts 38 can also be provided through each lip to facilitate the immediate removal of the product as a safety precaution.

Backing pads are also preferably used in conjunction with the penetration lips to accommodate different erection diameters. With reference to FIGS. 8 and 9, the core 12 is configured to allow one of backing pads 30*a*, 30*b* or 30*c* to be placed within the core on the inner surface diametrically opposite the rectangular opening 28. The backing pads function to bear down upon the male member as the user forces the vibration units 24 to contact the penis, as shown in FIG. 9, to thereby make secure contact between the penis and the units 24. The backing pads 30*a*, 30*b* and 30*c* have different thicknesses to accommodate male members of different diameters, to ensure secure contact with the vibration units. As also shown in FIG. 9, the resilient structure 27 allows the vibration units 24 to conform to the shape of the penis, ensuring good contact therewith. Preferably, the lips 20 and their associated pads 30*a*, 30*b* and 30*c* may be color coded to ensure that the appropriate lips are used with their associated pads.

Thus, not only does the present invention allow precise placement of the vibration units directly on the frenulum, but also customizes the device to accommodate the user's specific erection width dimension.

Figure 12:
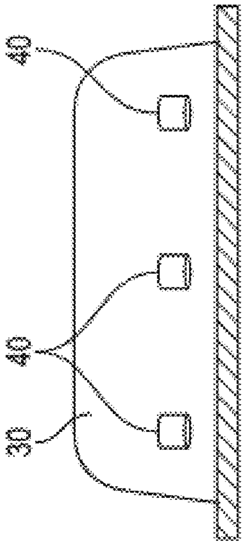
FIG. 12 illustrates an example of structure for mounting the back pad within the core.
Figure 11:
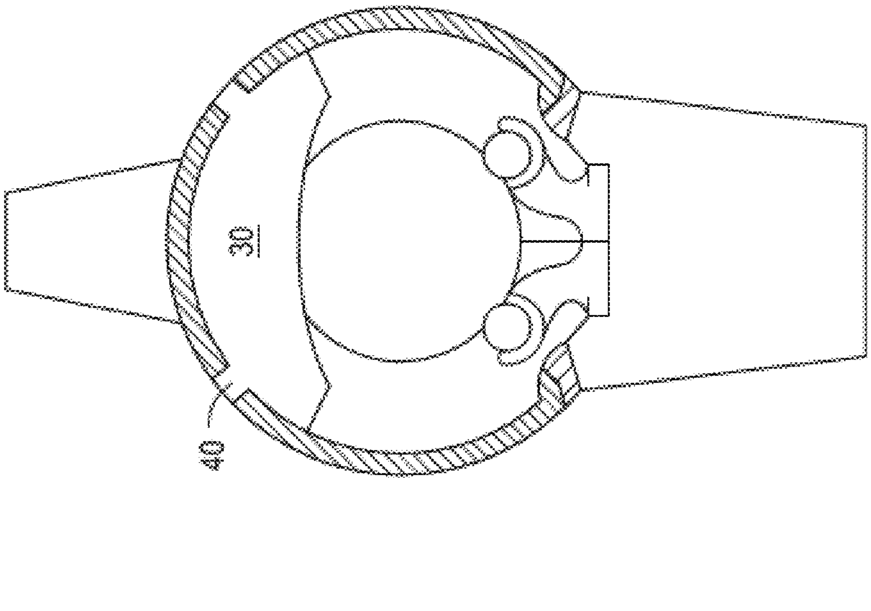
FIG. 11 is a cross-sectional view of the adjustable stimulator illustrating the mounting of a back pad within the core.

FIGS. 11 and 12 illustrate a preferred technique for securing the back pad 30 (one of pads 30*a*, 30*b* or 30*c*) to the core by providing tabs 40 on the back pad and associated notches on the core into which the tabs 40 are inserted.

Figure 13:
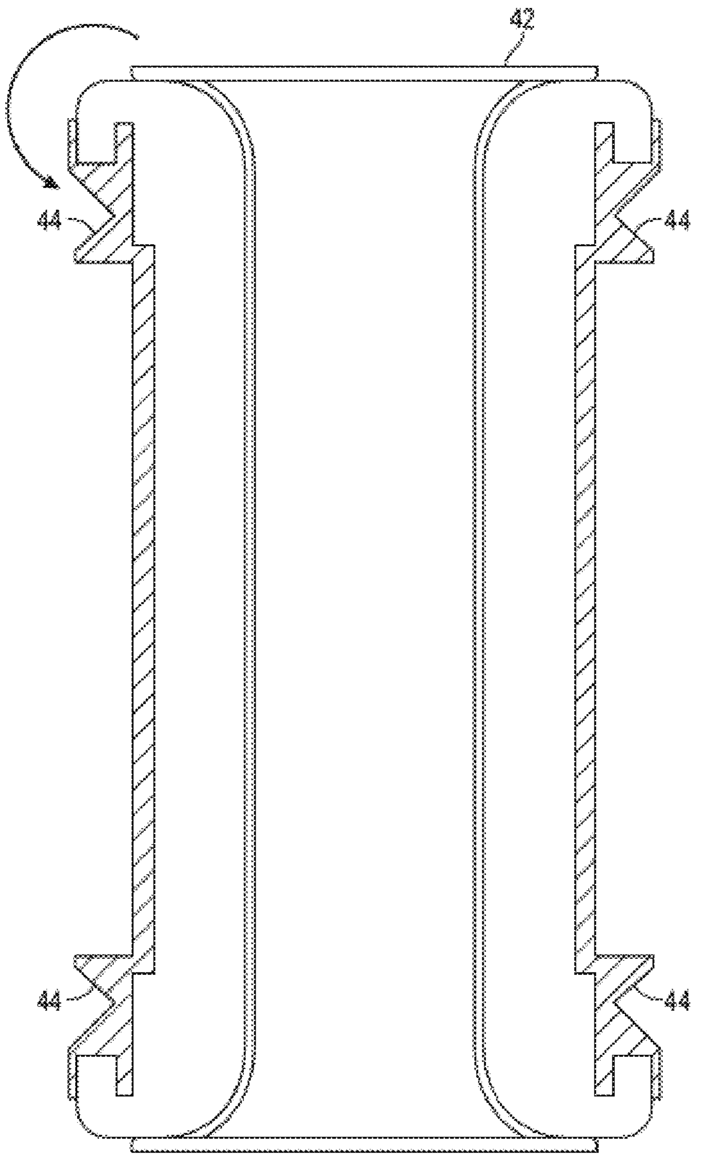
FIG. 13 illustrates the mounting of a sanitary liner within the core.

Finally, FIG. 13 is an illustration of a stretchable, disposable, sanitary liner 42, which can be placed in the interior of the core and secured at the top and bottom of the core by "V" shaped grooves 44 on either end of the core. It is noted that since top lip 22 is open, as best shown in FIG. 2, a water based or silicone-based lubricant can be applied to the interior of the core as the device is being used.

Thus, the present invention provides a male stimulator device that can be specifically tailored to accommodate a wide variety of male member lengths and widths, ensuring the positioning of vibrating units at a precise, desired location relative to the erection, and ensuring a snug circumferential fit about the erection. By providing the components of the genital stimulator described above, including the differing sized penetration lips 20 and backing pads 30 in a kit, the user can create a genital stimulator to perfectly accommodate his anatomy.

While the foregoing is directed to exemplary embodiments of the present invention, other and further embodiments of the invention may be devised without departing from the spirit and scope thereof, as defined in the following claims.

I claim:

1. An adjustable stimulator for male genitalia, comprising:

a cylindrical core having an opening therethrough and a cylindrical axis, said opening being offset along said cylindrical axis such that said opening is closer to a first end of said core than a second end of said core;

a penetration lip having an annular opening and adapted to be placed on one of said first and second ends of said core;

a vibratory module having at least one vibrating unit and adapted to be placed in said opening of said core such that said at least one vibrating unit is located within the interior of said core, said at least one vibrating unit being offset on said vibratory module along said cylindrical axis such that it is closer to a first end of said vibratory module than to a second end of said vibratory module;

whereby said at least one vibrating unit can be located at one of four discrete distances along said cylindrical axis relative to said penetration lip depending upon (i) whether said penetration lip is placed on said first or second end of said core, and (ii) the orientation of said vibratory module within said opening of said core, to thereby accommodate male members of different lengths.

2. The adjustable stimulator of claim 1 further comprising a plurality of pads of differing thicknesses, whereby a selected one of said plurality of pads is adapted to be placed in the interior of said core to accommodate different diameters of male members.

3. The adjustable stimulator of claim 1 further comprising a plurality of said penetration lips having an annular opening of differing diameters, whereby a selected one of said penetration lips is adapted to be placed on one of said first and second ends of said core to accommodate different diameters of male members.

4. The adjustable stimulator of claim 3 wherein said at least one vibrating unit is mounted on the interior of said core by a mount comprised of a flexible, resilient material, to allow said at least one vibrating unit to move toward the interior of said core to thereby conform to said male member.

5. The adjustable stimulator of claim 4 wherein said opening in said core is rectangular.

6. The adjustable stimulator of claim 5 wherein said vibratory module is comprised of a pair of vibrating units and a plurality of flexible projections aligned with each of said pair of vibrating units.

7. The adjustable stimulator of claim 6 wherein said pair of vibrating units and said plurality of flexible projections are flexibly and resiliently mounted on said vibratory module to allow said vibrating units and flexible projections to conform to said male member.

8. The adjustable stimulator of claim 5 further comprising a handle connected to said vibratory module and extending radially outward therefrom, and a grip extending radially outward from said core opposite said handle.

9. The adjustable stimulator of claim 3 wherein said penetration lips are provided with a plurality of auxiliary openings having diameters smaller than said annular opening diameter, said auxiliary openings circumferentially disposed around said annular opening.

10. The adjustable stimulator of claim 9 wherein said penetration lips are provided with at least one radial cut therethrough to facilitate quick removal of said stimulator from said male member.

11. The adjustable stimulator of claim 3 further comprising a top lip adapted to be placed on an end of said core opposite said penetration lip.

12. The adjustable stimulator of claim 11 further comprising a disposable liner adapted to be disposed within said interior of said core.

13. A kit for an adjustable stimulator for male genitalia, comprising:

a cylindrical core having a cylindrical axis and an opening on its surface, said opening being offset along said cylindrical axis such that said opening is closer to a first end of said core than a second end of said core;

a vibratory module having at least one vibrating unit thereon;

a mount for mounting said vibratory module on the interior of said core, the opening and the mount configured to allow the at least one vibrating unit to be located at different distances along the cylindrical axis; and a plurality of penetration lips for application to a selected one of the first end or the second end of said core, each of said plurality of lips having an annular opening of differing diameters;

whereby a user is able to configure said stimulator to accommodate the dimensions of the user's erection.

14. The kit of claim 13 wherein said stimulator can be configured to accommodate the diameter of the user's erection by selecting a specific one of said plurality of penetration lips.

15. The kit of claim 14 further comprising a plurality of pads of differing thicknesses to be applicated to the interior of said core at a location diametrically opposite said opening, to thereby further accommodate the diameter of the user's erection.

16. The kit of claim 13 wherein said stimulator can be configured to accommodate the length of the user's erection.

17. The kit of claim 16 wherein said at least one vibrating unit is offset on said vibratory module along said cylindrical axis such that it is closer to a first end of said vibratory module than to a second end of said vibratory module, and said stimulator can be configured to accommodate the length of the user's erection by placing one of said penetration lips on the selected end of said core, and by selectively orienting said vibratory module on said core.

18. The kit of claim 13 whereby said mount is comprised of a resilient material, to thereby allow the user to force said at least one vibrating unit to contact said user's erection using an amount of pressure.

19. The kit of claim 18 wherein said force may immediately be removed to thereby immediately remove contact between said vibrating unit and said erection.

* * * * *